(12) United States Patent
Phan

(10) Patent No.: US 6,425,316 B1
(45) Date of Patent: Jul. 30, 2002

(54) PISTON DRIVE MECHANISM

(76) Inventor: Thang Van Phan, 750 S. Federal Blvd., #308, Denver, CO (US) 80219

(*) Notice: Subject to any disclaimer, the term of this patent is extended or adjusted under 35 U.S.C. 154(b) by 0 days.

(21) Appl. No.: 09/532,642

(22) Filed: Mar. 21, 2000

(51) Int. Cl.[7] ............................................. F16J 1/14
(52) U.S. Cl. ............................................. 92/187
(58) Field of Search ................................. 92/187

(56) References Cited

U.S. PATENT DOCUMENTS

| 860,767 A | | 7/1907 | Rockwell | |
|---|---|---|---|---|
| 1,491,155 A | * | 4/1924 | McKone | 92/187 |
| 3,173,344 A | | 3/1965 | Mongitore | 92/187 |
| 3,971,355 A | * | 7/1976 | Kottmann | 92/187 |
| 4,070,122 A | | 1/1978 | Wisner | 92/187 |
| 4,109,364 A | | 8/1978 | Wisner | |
| 4,372,179 A | | 2/1983 | Dolenc et al. | |
| 4,399,778 A | | 8/1983 | Ancheta | |
| 5,442,993 A | | 8/1995 | Baliotti, II et al. | |
| 5,651,304 A | | 7/1997 | Allsopp | |
| 5,669,285 A | | 9/1997 | Wiczynski et al. | |
| 5,709,184 A | * | 1/1998 | Ali | 92/187 |

FOREIGN PATENT DOCUMENTS

| DE | 2 043 226 | 9/1970 |
|---|---|---|
| SU | 1 402 748 | 4/1986 |

* cited by examiner

*Primary Examiner*—F. Daniel Lopez
(74) *Attorney, Agent, or Firm*—Ramon L. Pizarro; Edwin H. Crabtree

(57) ABSTRACT

A piston drive mechanism for use in an internal combustion engine that allows for relative movement between the piston head and the connecting rod to permit the piston head to self align inside the cylinder. In the preferred form, the, mechanism includes an interior ball having a wrist pin that extends out from opposite sides of the interior ball. An intermediate housing movably contains the interior ball, and allows the wrist pin to extend beyond opposite sides of the intermediate housing. The intermediate housing allows the wrist pin And the interior ball freedom to move independently with respect to the intermediate housing. A connecting rod is fixedly connected to the intermediate housing. An exterior housing movably contains the intermediate housing. The exterior housing allows the wrist pin to extend beyond opposite sides of the exterior housing, and thus the exterior housing moves together with the interior ball. Additionally, the exterior housing allows the intermediate housing and the connecting rod freedom to move independently with respect to the exterior housing and the wrist pin.

8 Claims, 3 Drawing Sheets

PISTON DRIVE MECHANISM

BACKGROUND OF THE INVENTION

The present invention relates to a piston drive mechanism and more particularly to a self-aligning piston drive mechanism for use with a conventional piston head that allows relative movement between the piston head and the connecting rod.

In conventional internal combustion engines, a piston head moves in the cylinder in a reciprocating fashion. A gas air mixture is ignited within the piston cylinder, applying a force to the piston head, which then transmits this force to a wrist pin and thereby to a connecting rod. The connecting rod is rigidly connected to the wrist pin and the wrist pin is rigidly connected to the piston head. Because of these rigid connections, it is very difficult for the piston head to move in a true reciprocating fashion. If the piston head can not move in a true reciprocating fashion then inefficiencies such as uneven wear on the piston head or piston cylinder, incomplete combustion of the fuel, and higher expelled pollutants will result.

To overcome this problem it is essential to arrange the connecting rod exactly parallel to the axis of the crankshaft. This precise arrangement was technically very difficult and led to the development of self-aligning piston drive mechanisms, most notably U.S. Pat. Nos. 5,669,285 and 5,442,993. U.S. Pat. No. 5,669,285 discloses using a spherical joint with a spherical piston head to prevent canting or tilting of the piston head within the cylinder. The spherical joint is formed by a ball at the end of the connecting rod and is supported by a corresponding spherical socket in the piston head.

U.S. Pat. No. 5,442,993 teaches using a spherical bearing to provide for a self-aligning piston head.

SUMMARY OF THE INVENTION

The present invention is directed to a piston drive mechanism for use in an internal combustion engine, and more particularly to a self-aligning piston drive mechanism. The mechanism can be used with a conventional piston head and allows for relative movement between the piston head and the connecting rod to permit the piston head to self-align inside the cylinder wall. In the preferred form, the mechanism includes an interior ball having a wrist pin that extends out from opposite sides of the interior ball. An intermediate housing movably contains the interior ball, and allows the wrist pin to extend beyond opposite sides of the intermediate housing. The intermediate housing allows the wrist pin and the interior ball freedom to move independently with respect to the intermediate housing up, down or rotationally. A connecting rod is fixedly connected to the intermediate housing. An exterior housing movably contains the intermediate housing. The exterior housing allows the wrist pin to extend beyond opposite sides of the exterior housing, and thus the exterior housing moves together with the interior ball up or down, but will not rotate with the interior ball. Additionally, the exterior housing allows the intermediate housing freedom to move independently with respect to the exterior housing and the interior ball side to side. An adapter may be fixedly connected to the exterior housing to allow the piston drive mechanism to be used with conventional piston heads. The piston head is rotatably connected to either the wrist pin or the adapter.

An alternate embodiment of this invention includes an interior ball having a wrist pin that extends from opposite sides of the interior ball. An exterior housing movably contains the interior ball and allows for the wrist pin to extend beyond opposite sides of the exterior housing. The exterior housing allows the interior ball to move independently with respect to the exterior housing in either a reciprocating or rotational movement. A connecting rod is fixedly connected to the exterior housing and a piston head is rotatably connected to either the wrist pin or an adapter. The potential benefits derived from both of these preferred embodiments are reduced scuffing, reduced wear and tear on the piston head and the cylinder, reduced oil consumption and lower pollutant emissions.

There has thus been outlined, rather broadly, the more important features of the invention in order that the detailed description thereof that follows may be better understood, and in order that the present contribution to the art may be better appreciated. There are, of course, additional features of the invention that will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The accompanying drawings illustrate the complete preferred embodiment of the present invention according to the best modes presently devised for practical application of the principles thereof, and in which.

DETAILED DESCRIPTION OF THE INVENTION

Figure 5:
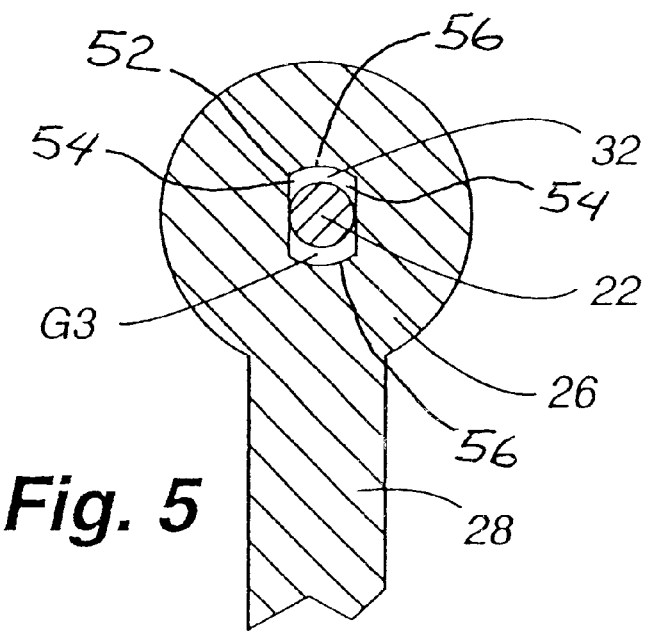
FIG. 5 is a view of the piston drive mechanism along the wrist pin axis.
Figure 6:
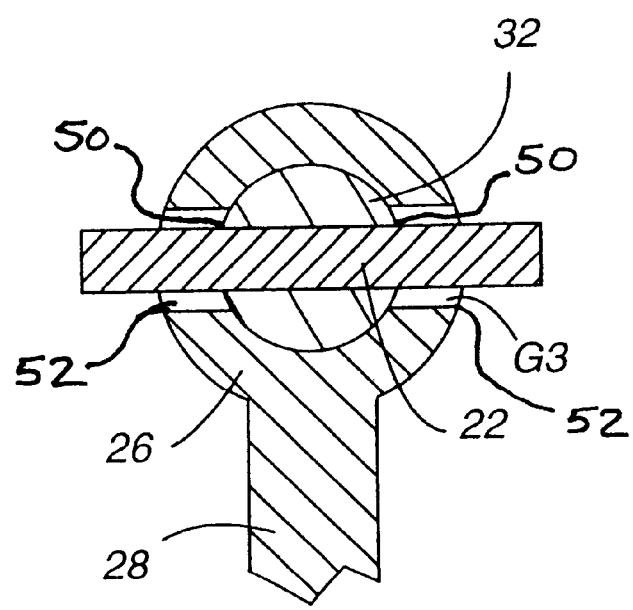
FIG. 6 is a side view of an alternate embodiment of the invention.

In the drawings like reference numerals throughout the various figures refer to like elements. Referring to the drawings in more detail, there is illustrated in FIGS. 1 to 4 a preferred form of the piston drive mechanism for use with a conventional piston head that allows for relative movement between the piston head and the connecting rod. FIGS. 5 and 6 illustrates an alternate form of the piston drive mechanism for use with a conventional piston head that also allows for relative movement between the piston head and the connecting rod. As a setting for the present invention, the preferred form and the alternate form will be described for use in an internal combustion engine. Nevertheless, it will be readily understood that the invention is conformable for use with other piston drive applications.

Figure 1:
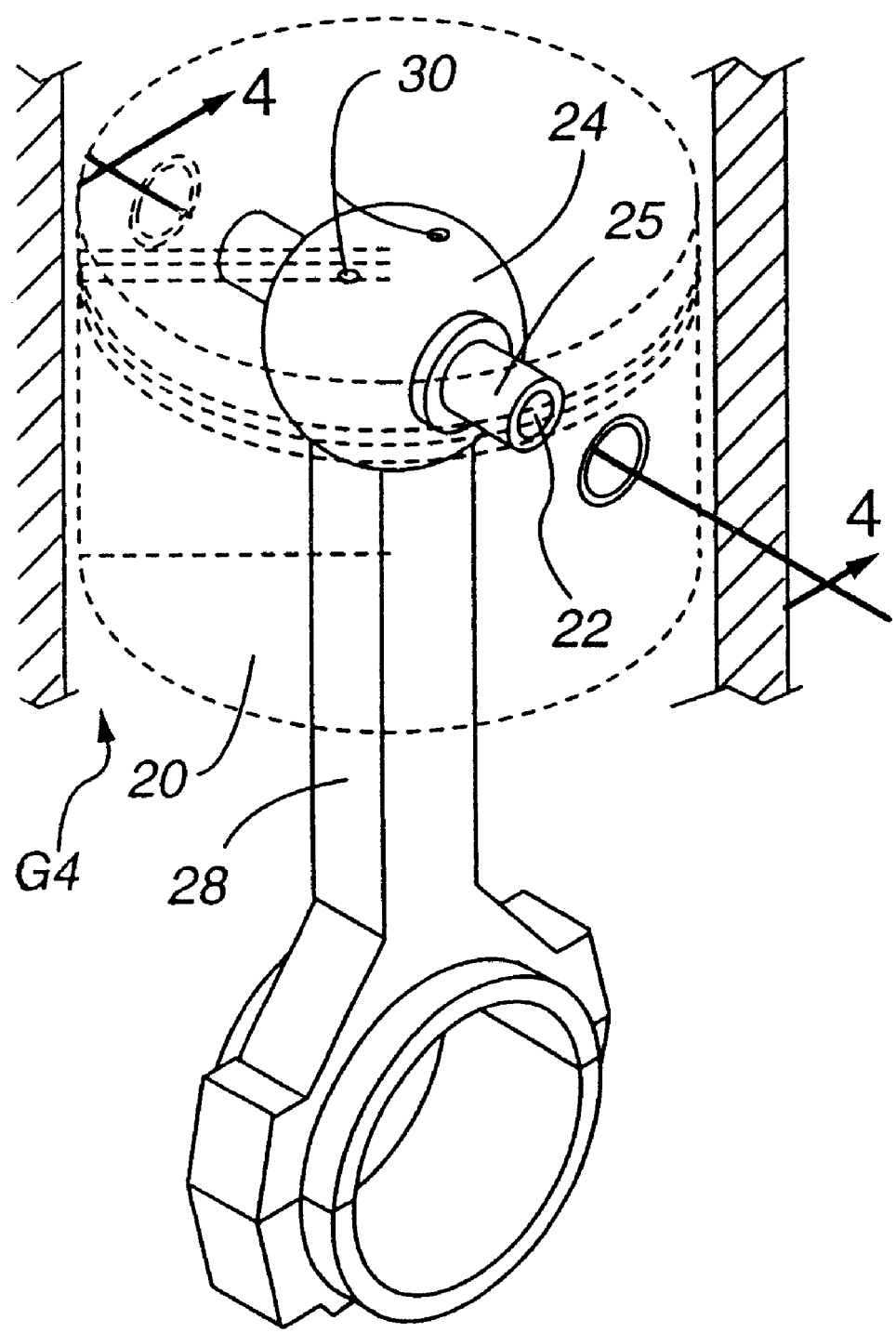
FIG. 1 is a front view of the piston drive mechanism.
Figure 2:
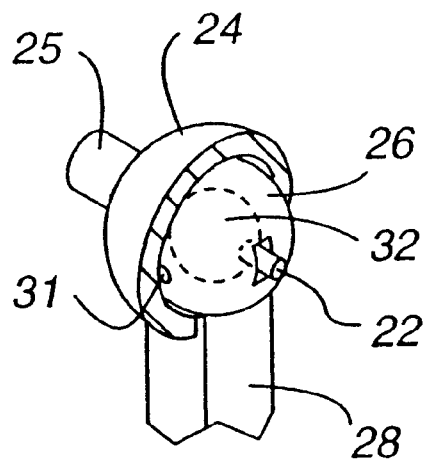
FIG. 2 is a front view partially in section of the intermediate housing.
Figure 3:
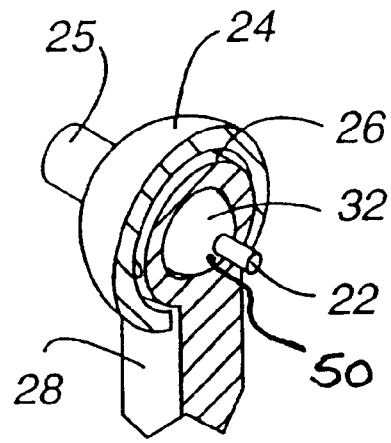
FIG. 3 is a front view partially in section of the inner ball.
Figure 4:
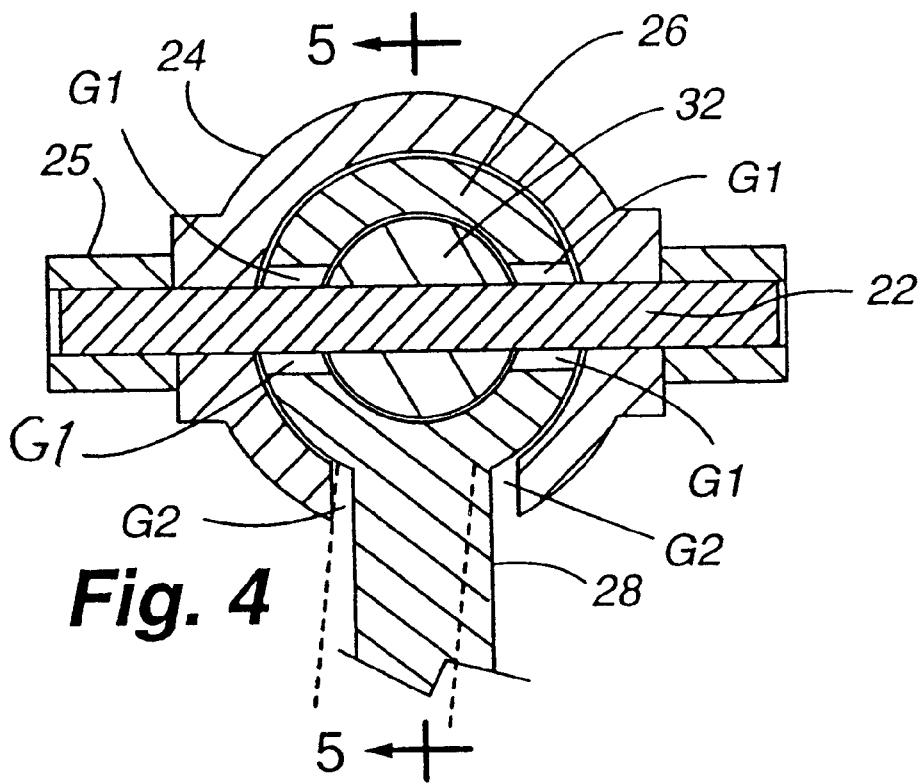
FIG. 4 is a. side view of the piston drive mechanism.

The preferred form of the piston drive mechanism, as shown in FIGS. 1 to 4, broadly comprises a wrist pin 22 which extends centrally through and beyond opposite sides on an interior ball 32. Although as shown in FIGS. 1 and 4 the interior ball 32 possess a hole therethrough and the wrist pin 22 is press fit within the hole, thereby frictionally restraining the wrist pin 22 from sliding relative to the ball 32 the wrist pin 22 may be integrally formed with the interior ball 32. Additionally, the wrist pin 22 may be connected to the interior ball 32 by any conventional means such as pins or glue. The interior ball is movably contained within and conformably surrounded by an intermediate housing 26 that also allows the wrist pin 22 to extend through and beyond opposite sides of the intermediate housing 26. The intermediate housing 26 preferably possess a spherical interior surface and a spherical outer peripheral surface. There is a gap G1 between the intermediate housing 26 and the wrist pin 22 in the region where the wrist pin 22 extends therethrough. Gap G1 allows the interior ball 32 and the wrist pin to move independently with respect to the intermediate housing 26 up, down or rotationally. An intermediate oil hole 31 allows oil or any other lubricant to seep through the intermediate housing and onto the interior ball 32. A connecting rod 28 is fixedly connected to and preferably integrally formed with, the intermediate housing 26, and thus the connecting rod and the intermediate housing move together.

An exterior housing 24 movably contains and conformably surrounds the intermediate housing 26. Additionally, the exterior housing 24 possess opposing holes through which the wrist pin 22 extends. Again, the holes are sized such that the wrist pin 22 is press fit within the hole and is frictionally restrained from sliding relative to the exterior housing 24. Thus the exterior housing 24 moves with the interior ball 32 and the wrist pin 22. Therefore the exterior housing 24 moves up or down with the interior ball 32 and the wrist pin 22, but will not rotate with respect to the interior ball 32 and the wrist pin 22. There is a gap G2 between exterior housing 24 and the connecting rod 28 externally therethrough. Gap G2 and gap G1 allow the connecting rod 28 and the intermediate housing 26 to move independently with respect to the exterior housing 24, the wrist pin 22, and the interior ball 32 in an up or down motion. A cylindrical collar or adapter 25 conformingly surrounds a corresponding end of the wrist pin 22 and extends outwardly from the exterior housing 24. The cylindrical collar or adapter 25 rotatably connects the piston head 20 to the piston drive mechanism. Exterior oil holes 30 allow oil or other lubricants to seep through the exterior housing 24 and onto the intermediate housing 26. Each adapter 25 is fixedly connected to the exterior housing 24, is used to rotatably connect the piston drive mechanism to the piston head 20 and is necessary only where the diameter of the wrist pin 22 is to small to allow the piston drive mechanism to be connected to a conventional piston head. The adapter 25 is shown on the FIGS. 1 to 4 only as an illustration and is not intended to be a limitation on this device. There is a gap G4 that extends the entire length between the piston head 20 and the cylinder 21 that allows the piston head 20 to move in a reciprocating fashion inside the cylinder 21. For best results the gap G4 should be no larger than the gap G2. In the preferred form the piston head 20 will be able to self-align either by the wrist pin 22, exterior housing 24, and the interior ball 32 moving up or down or by the connecting rod 28 and the intermediate housing 26 moving side to side.

The alternate form of the piston drive mechanism as show in FIGS. 5 and 6, is broadly comprised of a wrist pin 22 which extends centrally through and beyond opposite sides of an interior ball 32. The wrist pin 22 may be integrally formed with the interior ball 32 or may be frictionally secured to the interior ball 32. The interior ball is movably contained and conformingly surrounded by an intermediate housing 26 that also allows the wrist pin 22 to extend through and beyond opposite sides of the intermediate housing 26. There is a gap G3 between the intermediate housing 26 and the wrist pin 22. For best results, oil holes (not shown) should be located in the intermediate housing 26 to allow oil or other lubricants to seep through the intermediate housing and onto the interior ball 32. Gap G3 allows the interior ball 32 and the wrist pin 22 to move independently with respect to the intermediate housing 26 up, down or rotationally. The piston head would then be rotatably connected to the wrist pin 22. A connecting rod 28 is fixedly connected to, and preferrably integrally formed with the intermediate housing 26. The gap G3 allows the interior ball 32 to move independent with respect to the intermediate housing 26 in either an up, down or rotational fashion and thus will allow the piston head freedom to move relative to and to self-align in the piston cylinder.

As illustrated in FIGS. 2, 4, 5 and 6, it is contemplated that the wrist pin 22 will extend from opposite sides 50 of the interior ball 32. Additionally, the intermediate housing 26 will include a pair of elongated apertures 52. The elongated apertures 52 will include a pair of opposing, spaced apart sides 54 and spaced apart ends 56. As illustrated, the spaced apart ends 56 of each of the apertures will be at a greater distance from one another than the spaced apart sides 54 of each of the apertures 52, so that the wrist pin 22 is restricted to movement between the ends of the elongated apertures while guided by the spaced apart sides of each of the apertures.

In actual practice, the piston head 20 moves in a reciprocating fashion inside the cylinder. A gas air mixture is ignited within the cylinder, applying a force on the piston head, forcing the piston head down and transmitting a reciprocating force to the connecting rod. If the piston head cannot move in a true reciprocating fashion then the piston head will knock or rub against the cylinder and inefficiencies such as uneven wear on the piston head or cylinder, incomplete combustion of fuel, and higher expelled pollutants will result. In this case the gaps G1 and G2 allow the piston head to move relative to the connecting rod and will allow the piston to self-align, thereby preventing or substantially avoiding any inefficiencies.

Those having skill in the art to which the present invention relates will now, as a result of the teaching herein, perceive various modifications and additions which may be made to the invention, such as alternative shapes. Accordingly, all such modifications and additions are deemed to be within the scope of the invention which is to be limited only by the claims.

I claim:

1. A piston drive mechanism comprising:

an interior ball;

a wrist pin extending from opposite sides of said interior ball; an intermediate housing operatively designed to movably contain said interior ball, said intermediate housing allowing said wrist pin to extend beyond opposite sides of said intermediate housing; primary means to allow said wrist pin to move independently with respect to said intermediate housing;

a connecting rod fixedly connected to said intermediate housing;

an exterior housing operatively designed to movably contain said intermediate housing, said exterior housing allowing said wrist pin to extend beyond opposite sides of said exterior housing, and said wrist pin being fixedly connected to said exterior housing; secondary means to allow said exterior housing to move independently with respect to said intermediate housing and in concert with said wrist pin;

a piston head rotatably connected to said wrist pin.

2. A piston drive mechanism comprising:

an interior ball;

a wrist pin extending from opposite sides of said interior ball;

an intermediate housing operatively designed to movably contain said interior ball, said intermediate housing allowing said wrist pin to extend beyond opposite sides of said intermediate housing;

primary means to allow said wrist pin to move independently with respect to said intermediate housing;

a connecting rod fixedly connected to said intermediate housing;

an exterior housing operatively designed to movably contain said intermediate housing, said exterior housing allowing said wrist pin to extend beyond opposite sides of said exterior housing;

secondary means to allow said exterior housing to move independently with respect to said intermediate housing and in concert with said wrist pin;

an adapter connected to said exterior housing; and a piston head rotatably connected to said adapter.

3. A piston drive mechanism of claim 2, wherein said adapter is fixedly connected to said exterior housing.

4. A piston drive mechanism of claim 2, wherein said wrist pin is fixedly connected to said exterior housing.

5. A piston drive mechanism of claim 2, wherein said wrist pin is fixedly connected to said adapter.

6. A piston drive mechanism of claim 2, wherein said primary means is a gap between said wrist pin and said intermediate housing.

7. A piston drive mechanism of claim 2, wherein said secondary means is a gap between said exterior housing and said connecting rod.

8. A piston drive mechanism of claim 2, wherein said wrist pin is fixedly connected to said interior ball.

* * * * *